United States Patent [19]

Chang

[11] Patent Number: 5,588,705
[45] Date of Patent: Dec. 31, 1996

[54] SEATBACK RECLINER MECHANISM

[76] Inventor: Chung L. Chang, 22834 Lazy Trail Rd., Diamond Bar, Calif. 91765

[21] Appl. No.: 431,441

[22] Filed: May 1, 1995

Related U.S. Application Data

[62] Division of Ser. No. 132,663, Oct. 6, 1993, Pat. No. 5,433,507.

[51] Int. Cl.$^6$ ........................................ B60N 2/02
[52] U.S. Cl. ................ 297/367; 297/378.12; 297/463.2
[58] Field of Search .................................. 297/367, 368, 297/369, 378.12, 363, 365, 463.2; 70/432, DIG. 59

[56] References Cited

U.S. PATENT DOCUMENTS

| | | |
|---|---|---|
| 325,352 | 9/1885 | McKay . |
| 778,821 | 12/1904 | Duryea . |
| 1,664,893 | 4/1928 | Meyering . |
| 2,153,998 | 4/1939 | Verderber et al. . |
| 2,336,013 | 12/1943 | Hamilton . |
| 2,949,043 | 8/1960 | Fichter et al. . |
| 3,081,114 | 3/1963 | Esty . |
| 3,156,004 | 11/1964 | Strien et al. . |
| 3,185,510 | 3/1965 | Huckins et al. . |
| 3,315,298 | 4/1967 | Strien et al. . |
| 3,398,987 | 8/1968 | Lynn et al. . |
| 3,432,881 | 3/1969 | Putsch et al. . |
| 3,479,088 | 11/1969 | Bonnaud . |
| 3,507,000 | 4/1970 | Strien et al. . |
| 3,602,547 | 8/1971 | Tabor . |
| 3,608,128 | 9/1971 | Faust . |
| 3,638,243 | 2/1972 | Campbell, Jr. et al. . |
| 3,731,342 | 5/1973 | Cousin . |
| 3,788,698 | 1/1974 | Perkins . |
| 3,833,965 | 9/1974 | Hess . |
| 3,840,268 | 10/1974 | Johndrow . |
| 3,902,757 | 9/1975 | Yoshimura . |
| 3,931,996 | 1/1976 | Yoshimura . |
| 3,966,253 | 6/1976 | Berghof et al. . |
| 3,973,288 | 8/1976 | Pickles . |
| 3,999,247 | 12/1976 | Cremer . |
| 4,085,969 | 4/1978 | Nakane . |
| 4,103,964 | 8/1978 | Klingelhofer et al. . |
| 4,147,386 | 4/1979 | Stolper . |
| 4,178,037 | 12/1979 | Pickles . |
| 4,223,947 | 9/1980 | Cremer . |
| 4,314,729 | 2/1982 | Klueting . |
| 4,457,557 | 7/1984 | Une . |
| 4,872,726 | 10/1989 | White et al. . |
| 4,875,735 | 10/1989 | Moyer et al. . |
| 5,133,265 | 7/1992 | Lahti et al. .................. 20/432 |

FOREIGN PATENT DOCUMENTS

| | | |
|---|---|---|
| 51819 | 2/1972 | Australia . |
| 758404 | 5/1967 | Canada . |
| 0006610 | 6/1979 | European Pat. Off. . |
| 1414700 | 11/1964 | France . |
| 2339535 | 3/1975 | Germany . |
| 2404216 | 8/1975 | Germany . |
| 2845545 | 4/1980 | Germany . |
| 3027629 | 2/1982 | Germany . |
| 747800 | 4/1956 | United Kingdom . |
| 1342371 | 1/1974 | United Kingdom . |

OTHER PUBLICATIONS

Figures 1a & 1b –Prior Art Drawing; Hsin–Chun, Incorporated, Manufacturer, Jun. 1985, Taiwan.
Figure 2 –Prior Art Drawing; Hsin–Chun, Incorporated, Manufacturer, Jun. 1985, Taiwan.

Primary Examiner—Peter M. Cuomo
Assistant Examiner—Anthony D. Barfield
Attorney, Agent, or Firm—Knobbe, Martens, Olson & Bear

[57] ABSTRACT

A hinge fitting for a reclining vehicle seat structure comprises a fixed support bracket, a seatback member, a locking member, and a lock actuating mechanism. The lock actuating mechanism includes a cam that interacts with the locking member to urge the locking member into locking and unlocking positions. Proper positioning of the cam and locking member directs a force applied to the seatback that maintains a locking position. Alignment means is provided ensuring a proper positional relationship between the cam and locking member to correctly direct the applied force. The cam is operated through a linkage assembly which contains a biasing spring that is entirely shielded from user contact. Construction of the hinge fitting is facilitated by manufacturing a universal hinge fitting capable of assembly in multiple configurations.

6 Claims, 5 Drawing Sheets

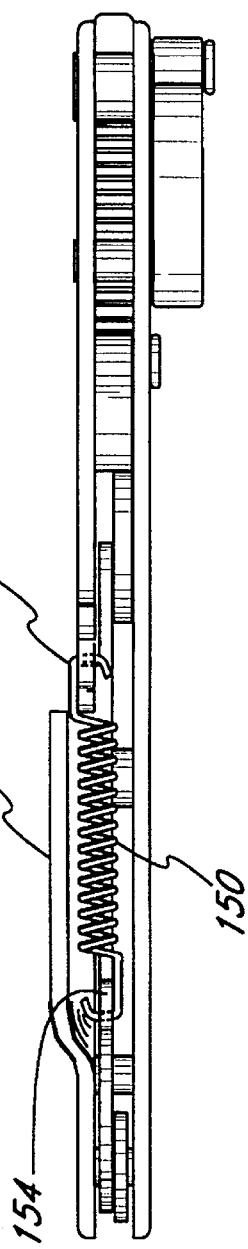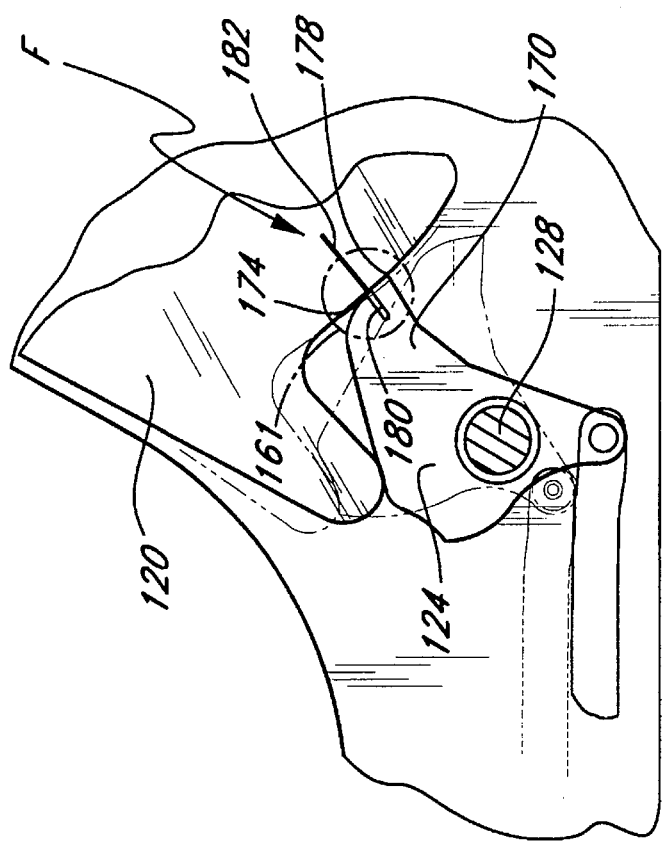

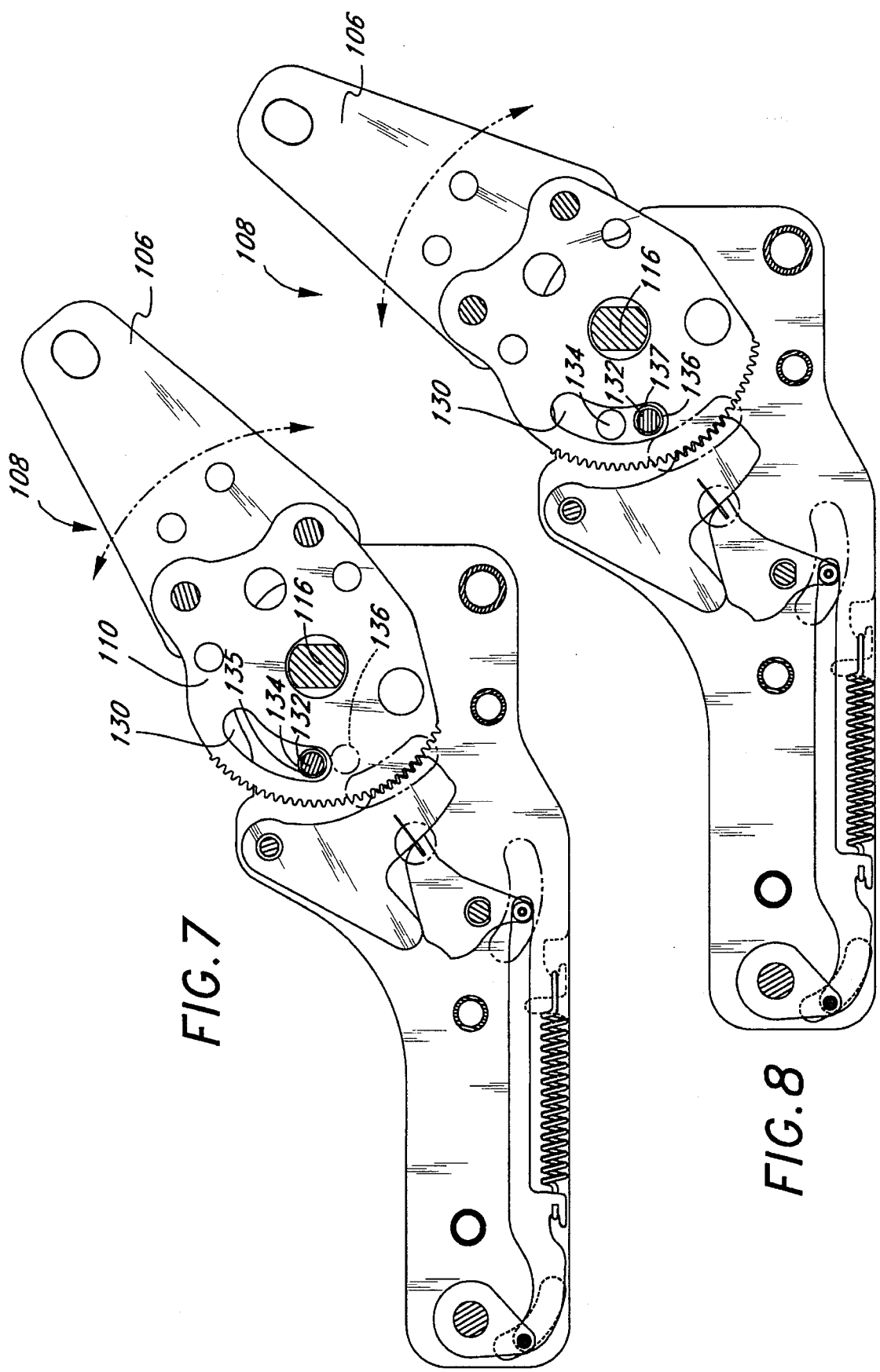

SEATBACK RECLINER MECHANISM

This application is a divisional of application Ser. No. 08/132,663, filed Oct. 6, 1993, now U.S. Pat. No. 5,433,507.

BACKGROUND

The present invention relates generally to hinge fittings for a reclining vehicle seat structure and, more particularly, to a novel design and arrangement of the lock actuating mechanism for such a seat structure.

Vehicle seats are generally designed for simultaneous forward and rearward adjustment of the seat and seatback members. Other adjustments (e.g., vertical or tilt) of both seat and seatback members, as a unit, may or may not be provided. However, it is often desirable to allow for adjustment of the seatback member, relative to the seat member, to provide an adjustable reclining seatback. Hinge fittings which provide for this type of adjustment normally include a fixed support bracket mounted to the vehicle seat, a seatback support member which is adjustable through a range of reclining positions and which is attached to the seatback and pivotally connected to all of the following: the fixed support bracket, a locking member to lock the seatback support at various inclined positions, and a lock actuating mechanism for engaging or disengaging the locking member.

Examples of hinge fittings of this general type are shown in U.S. Pat. No. 3,999,247 to Cremer and U.S. Pat. No. 3,973,288 to Pickles. Refinements related to the specific shape and dimensional characteristics of the lock actuating mechanism, which in this patent includes a cam and a pawl, are shown in U.S. Pat. No. 4,223,947, also to Cremer, and U.S. Pat. No. 4,875,735 to Moyer and the Applicant. Other refinements have been made to the pivot arm assembly and linkage which controls the lock actuating mechanism, like those found in U.S. Pat. No. 4,875,735 to Moyer and the Applicant and U.S. Pat. No. 4,872,726 to White.

Problems with hinge fittings of the above-referenced types relate to undesired contact between the linkage of the pivot arm assembly and other components in the hinge fitting. This occurs during adjustment of the level of reclination which naturally requires movement of the hinge fitting mechanisms. Also, undesired contact can occur between the linkage and both the seat to which the hinge fitting is attached, as well as the user. Specifically, placement of the linkage connecting rod and the corresponding biasing spring, collectively the linkage assembly, in previously designed hinge fittings left portions of the linkage assembly, and in particular the biasing spring, exposed to external surroundings. During adjustment of the seat, when the user's hand is near the linkage assembly, movement of the linkage assembly sometimes caused damage to the seat itself and posed a threat of injury to the user.

Another problem with prior art hinge fittings was the difficulty of assuring that the assembled fitting would withstand sufficient torque when in the locked position without releasing. This problem is accentuated by the stacking of tolerances effect that occurs when assembling the fitting. Although one previous prior fitting determines whether the stacked tolerances were within the acceptable range by whether an alignment dot appeared in the upper or lower half of a view window defined by a sandwich plate, this approach has significant limitations.

Also, hinge fittings are used in commercial applications where a certain maximum reclining position is desired. Specifically, most applications utilize hinges having a maximum angle of reclination of 30° or 45°. Accordingly, manufacturers currently manufacture and warehouse hinges having a maximum angle of reclination of 30° and hinges having a maximum angle of reclination of 45°.

SUMMARY OF THE INVENTION

Accordingly, the present invention provides a hinge fitting for a reclining vehicle seat which has a linkage structure that will not adversely affect the hinge fitting itself or the vehicle seat, and will also not cause injury to the operator.

Another aspect of the invention is a hinge fitting for a reclining vehicle seat which can quickly and accurately be checked for proper alignment of the lock actuating mechanism to ensure that usage of the reclining seat will not result in an unwanted disengagement of the mechanism.

A further aspect of this invention is a hinge fitting for a reclining vehicle seat which can be assembled to provide either of two maximum reclination angles commonly used by consumers.

Desirably, a hinge fitting of the present invention includes a fixed support bracket, a seatback support member pivotally connected to the fixed support bracket and adjustable through a range of inclined positions, a locking member pivotally connected to the support bracket for locking the seatback support member in a desired position, and a lock actuating mechanism for moving the locking member to a locking and an unlocking position. The lock actuating mechanism includes a cam which engages the locking member at an engagement point, when the locking member is in the locking position, such that a force applied to the cam by the locking member at the engagement point tends to pivot the cam in a direction which causes the cam to urge the locking member toward the locking position.

Advantageously, to ensure that the cam and the locking member are in the correct positional relationship which will direct this force properly, alignment markings are placed directly on both the cam and the locking member. Importantly, these markings extend substantially to the edge formed between the outwardly facing surfaces of the cam and camming surface and to the edge formed by the outwardly facing surfaces of the locking member and the locking surface which mates with the camming surface. Accordingly, there is little risk that although the housing and the cam are aligned, the cam and the pawl are not. Likewise, these markings can be seen before the unit is fully assembled, facilitating a quick correction of any problem. However, desirably, a view window is provided in the seat support bracket to enable the tolerances to be checked once the unit is fully assembled to determine whether tolerance problems have arisen as a result of the remainder of the assembly process.

The locking mechanism is controlled via a linkage member and an operating handle. The linkage member and associated biasing spring are protected during movement from interference with the hinge fitting, portions of the seat, and from the actual reclining seatback user. The preferred embodiment of the invention is constructed in a universal configuration which allows for assembly in one of two formats depending on the level of maximum inclination for the vehicle seat.

These and other features of the present invention will become more fully apparent from the following description and dependent claims taken in conjunction with the accompanying drawings.

BRIEF DESCRIPTION OF THE DRAWINGS

FIG. 5 is a bottom view of the hinge fitting of FIG. 4.

FIG. 6 is an enlarged partial sectional view of the hinge fitting of FIG. 4 depicting the interaction between the cam and the locking mechanism.

FIG. 7 is a side elevation of the hinge fitting of FIG. 4 depicting a first configuration allowing a maximum reclining position of 45 degrees.

FIG. 8 is a side elevation of the hinge fitting of FIG. 4 depicting a second configuration allowing a maximum reclining position of 30 degrees.

DETAILED DESCRIPTION OF THE DRAWINGS

Figure 1A:
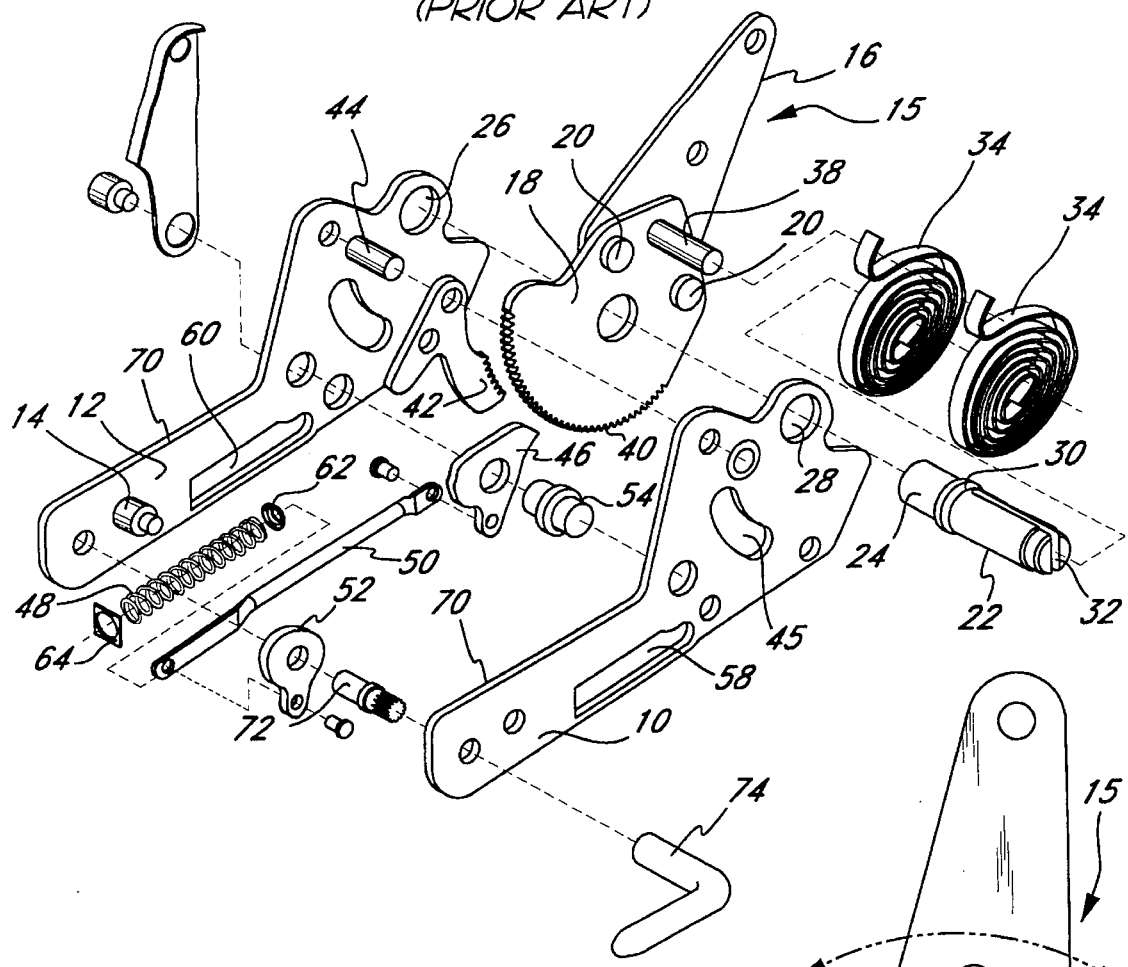
FIG. 1a is an exploded perspective view of a first hinge fitting, as exists in the prior art, having fixed support sections for mounting the release handle and linking the handle to an actuator assembly.

Referring now to FIG. 1a, there is illustrated a prior art hinge fitting for a reclining vehicle seat structure. The structure includes a fixed support bracket which comprises plate members 10 and 12, which are fastened together and spaced apart by suitable fastening means 14. The seatback support member 15 is comprised of upper portion 16, which is adapted for mounting to the vehicle seatback, and lower portion 18 which is rigidly connected by fasteners 20 to upper portion 16. Lower portion 18 is mounted for movement between plates 10 and 12 by a pin, shown generally at 22. The pin 22 has an end portion 24 which is inserted through opening 28, through the lower portion 18 of member 15 and into an opening 26 in the plate 12. In addition, pin 22 has a shoulder portion 30 and slotted portion 32. Slotted portion 32 is adapted to receive springs 34 and 36 which coact with post 38, mounted on lower portion 18, to bias seatback support member 15 toward an upright position.

The lower portion 18 of the seatback support member 15 has an arcuate peripheral section 40, which is generally concentric with the axis of pin 22 and which has teeth disposed thereon. These teeth are engaged by matching teeth on the pawl 42, which serves to lock the seatback support member 15 in an adjusted position. The pawl 42 is pivotally mounted between the plates 10 and 12 by a pivot pin 44. A gear view slot 45 is provided in the plate 10 to allow for visual observation of teeth engagement during assembly.

Figure 1B:
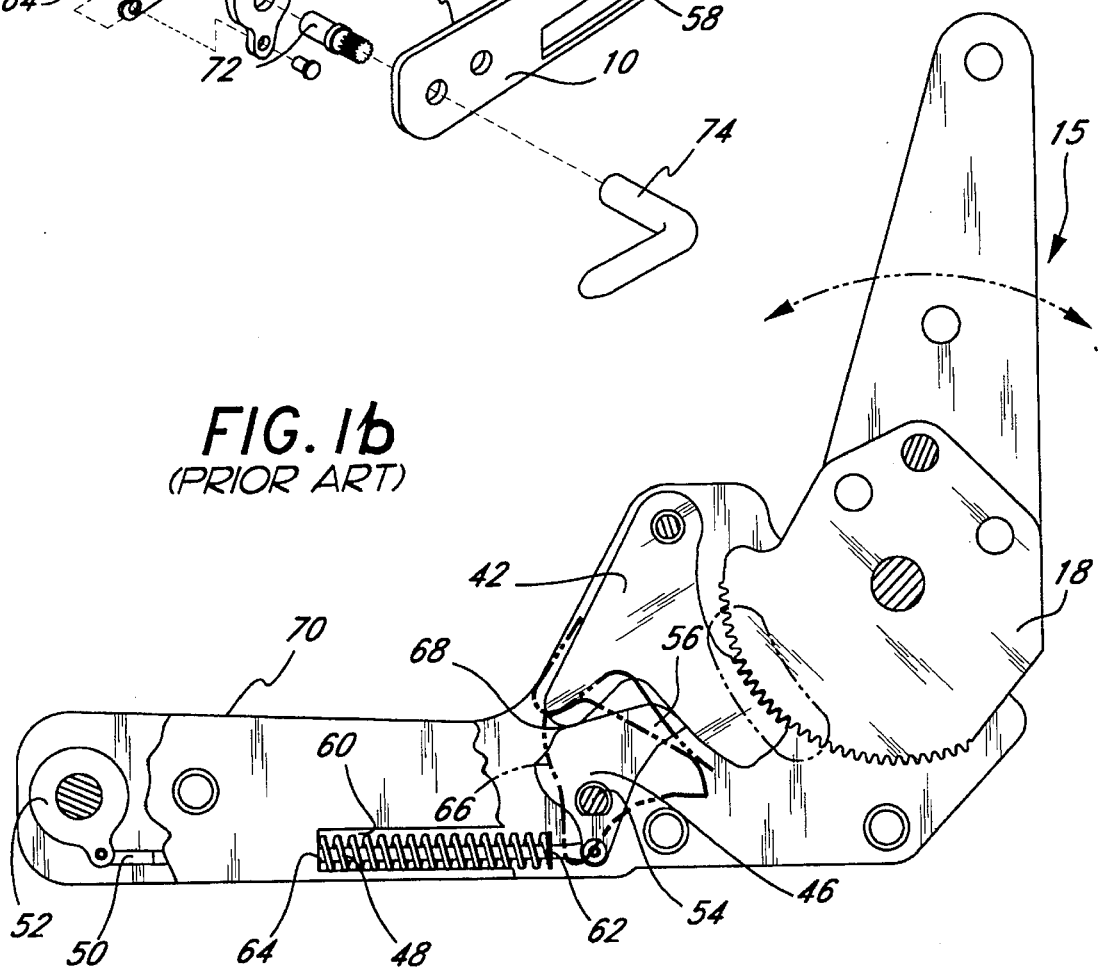
FIG. 1b is a sectional view of the hinge fitting shown in FIG. 1a depicting the internal components.

Operation of the mechanism which engages pawl 42 with the teeth on peripheral section 40 is best understood by reference to FIG. 1b which is a sectional side view of the device shown in FIG. 1a depicting the internal components. The actuating mechanism which moves pawl 42 into the locking and unlocking positions includes a cam 46, a spring 48, a connecting rod 50, and an operator 52. In FIG. 1b, cam 46 is shown holding pawl 42 in the locking position (i.e., the teeth of pawl 42 are engaged with the teeth on lower portion 18 of seatback support member 15). The cam 46, which is pivotally mounted between the plates 10 and 12 by a pivot pin 54, has a first cam arm 56 which engages the pawl 42 to move and hold the pawl 42 in this position. Cam 46 is biased by spring 48, through which connecting rod 50 is placed, in a counterclockwise direction (as shown in FIG. 1b), to ensure that pawl 42 returns to and remains in a locking position when the angle of the seatback support member 15 is not being adjusted. In the configuration shown in FIG. 1a, spring 48 is positioned around connecting rod 50 and rests partially in a slot formed by openings 58 and 60 of the plates 10 and 12, respectively. At the end of the connecting rod 50 near cam 46, spring 48 is retained by clip 62, as shown in FIG. 1b, which is attached to connecting rod 50. At the other end of connecting rod 50 spring 48 is retained by clip 64 which is held in place by plates 10 and 12 and specifically held in place at one end of the openings 58 and 60 as shown. Thus, when a pulling force is applied to connecting rod 50, cam 46 is rotated in a clockwise direction to disengage first cam arm 56 from pawl 42 to allow movement of pawl 42 to the unlocking position. Cam 46 has a second cam arm 66 which engages pawl 42 at point 68 for positive displacement to the unlocking position. When a pulling force is so applied spring 48 is compressed between clip 62 which moves with the connecting rod 50, and between clip 64 which remains stationary. Upon release, spring 48 urges, through mechanical interaction, the pawl 42 back into a locking position.

The radial spacing of cam arms 56 and 66 can be selected to reduce, or increase, the amount of rotational movement of the cam 46 which is required to move the pawl 42 from the locking to the unlocking position. For example, if cam arm 66 is moved closer (in the clockwise direction) to cam arm 56, the distance from cam arm 66 to pawl 42, when pawl 42 is in the locking position, will be decreased. Then upon rotation of cam 46, cam arm 66 will contact pawl 42 sooner and pawl 42 will be urged into the unlocking position with less required rotation of cam 46 and, correspondingly, less rotation of operator 52.

Referring again to FIG. 1a, one end of connecting rod 50 is attached to cam 46 to provide for application of a pulling force to cam 46, causing it to rotate in a clockwise direction (as viewed in FIG. 1b). The other end of connecting rod 50 is attached to operator 52 which is pivotally mounted between plates 10 and 12 by a pin 72 at a point which is near the end of elongated portion 70 of plates 10 and 12. An end of pivot pin 72 is suitably shaped to receive an operating handle or lever 74 to allow for rotational movement of operator 52 and, via connecting rod 50, cam 46.

There are several problems associated with hinge fittings constructed as shown in FIGS. 1a and 1b. First, placement of spring 48 in the position shown in FIG. 1b makes the spring itself exposed and unprotected from contact with other parts of the reclining seat, or from contact with an individual using the seat. An exposed spring often has sharp edges at its termination points and any problems associated with the exposed spring are compounded because the spring is moved back and forth every time the angle of seat inclination is adjusted. This motion can lead to tearing of the associated reclining seat or it can cause injury to the user who must place his or her hands near spring 48 when adjusting the seat by turning lever 74.

Figure 2:
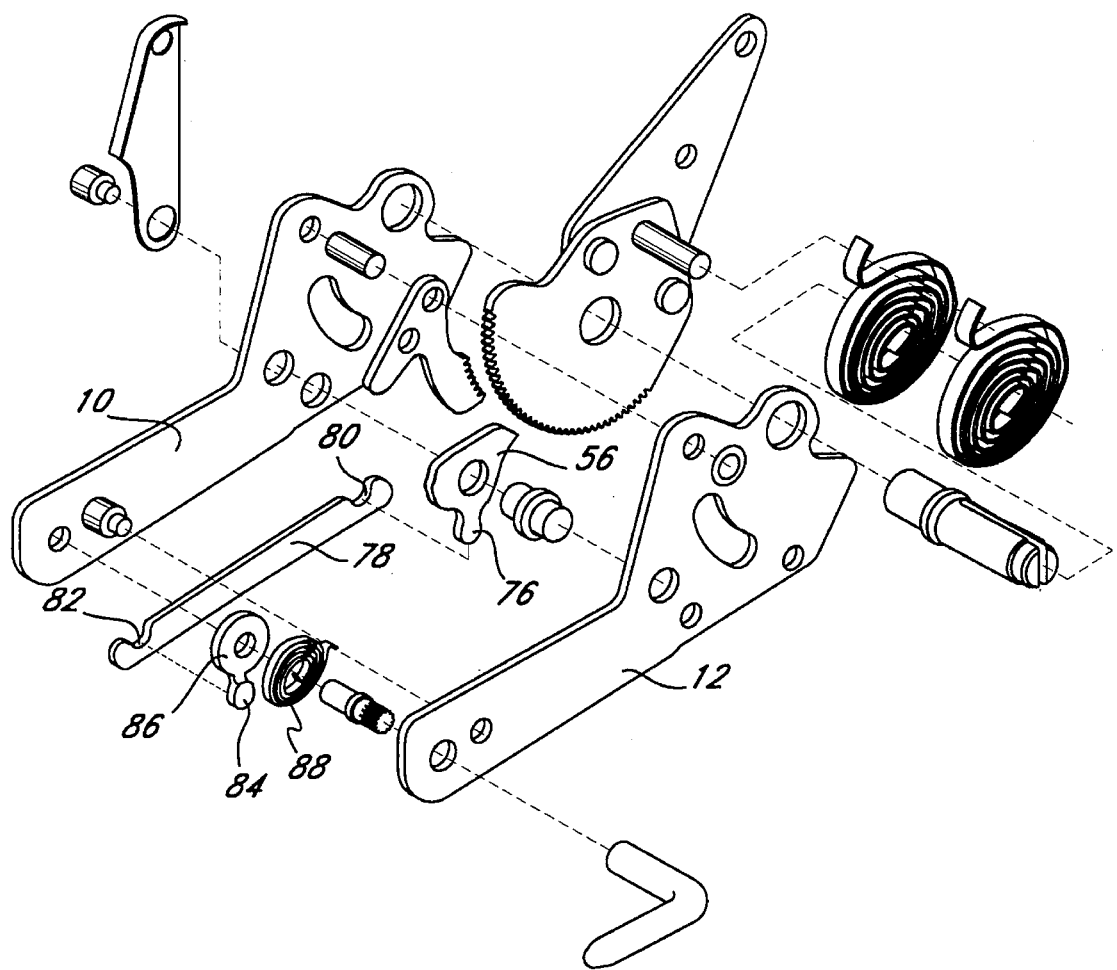
FIG. 2 is an exploded perspective view of a second hinge fitting, as exists in the prior art, having fixed support sections for mounting the release handle and linking the handle to an actuator assembly.

FIG. 2 depicts another prior art hinge fitting. The device shown in these figures is similar to that shown in FIGS. 1a and 1b. For simplicity, those elements which are common to the devices of FIGS. 1 and 2 retain the same numerical description. Elements of FIG. 2 not present in FIG. 1 are primarily those of the linkage which connects the cam 56 to the lever 74. Specifically, referring to FIG. 2, cam 56 is formed with a cam tab 76 which engages a link 78 at a socket 80. The link 78 is formed as an elongated planar connector which fits in between, and parallel to, the plates 10 and 12. At the opposite end of the link 78, a socket 82 is used to attach the link 78 to a tab 84 formed as part of the operator 86. To properly bias the pawl 42 into a locking position, a spring 88 can be placed as shown over one end of pivot pin 72 and held in place so that rotation of lever 74 in a clockwise direction increases the tension on the spring 88. As with the device shown in FIG. 1a and 1b, the spring 88 of FIG. 2 is exposed to the seat and to the user during operation, creating a potential hazard. This and other problems with the prior art have been successfully overcome as will be explained in greater detail below in conjunction with FIGS. 3–8.

Figure 3:
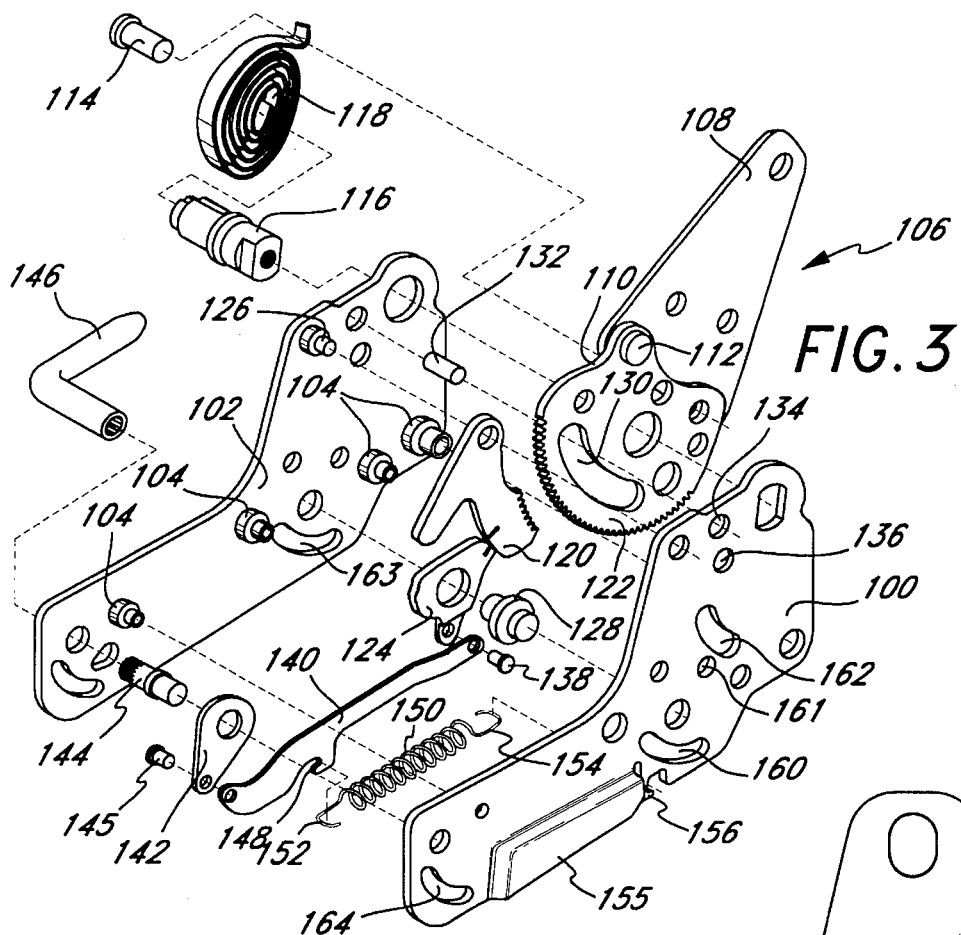
FIG. 3 is an exploded perspective view of a hinge fitting in accordance with the present invention.

In FIG. 3, there is shown a preferred embodiment of a hinge fitting in accordance with the present invention. The structure includes a fixed support bracket comprised of plate members 100 and 102 which are fastened together in a spaced-apart configuration by several fasteners 104. A seatback support member 106 also has an upper portion 108 and a lower portion 110 which are connected together by fastener 112 and a post 114. As with other hinge fittings, the support member 106 is mounted for movement by a pin 116 which interacts with a spring 118 and the post 114 to bias the support member 106. The lower portion 110 contains an arcuate aperture 130 through which a limiting pin 132 passes. As will be discussed later, limiting pin 132 may be mounted between plates 100 and 102 in either an aperture formed by openings 134 and 135, or an aperture formed by openings 136 and 137. However, whether mounted in either of these apertures, the axis of the pin 132 will be placed at a point which lies along the centerline of the arc transcribed by the arcuate aperture 130 as the seatback support member 106 is rotated.

Teeth disposed upon a pawl 120, held in place by a pivot pin 126, mate with teeth disposed on the arcuate peripheral section 122 of lower portion 110 to lock the support member 106 in an adjusted position. The actuating mechanism which engages pawl 120 with section 122 includes a cam 124 held in place between plates 100 and 102 by a pivot pin 128. Cam 124 is attached by a pin 138 to a connecting rod 140 which in turn is connected to an operator 142 by a pin 145. A pivot pin 144 is used to hold the operator 142 in place relative to plates 100 and 102, and to apply torque from the lever 146 to the operator 142.

Formed as part of connecting rod 140, near the end which is attached to the operator 142, is a hook 148 for accepting an end of biasing spring 150 which is bent into a corresponding hook 152. The other end of spring 150 is also bent into a hook 154 and is attached to a corresponding hook 156 formed as part of plate 100. Also formed as part of plate 100 is a protective hood 158 which, upon assembly, surrounds spring 150 and protects against external contact. Alternatively, the hood 158 may not be formed as part of plate 100 but rather made and attached as a separate component. Arcuate apertures 160, 162 and 164 are formed in plate 100 and apertures 163 and 165 are formed in plate 102. These apertures serve functions which will be described in more detail in conjunction with FIGS. 4–7.

Figure 4:
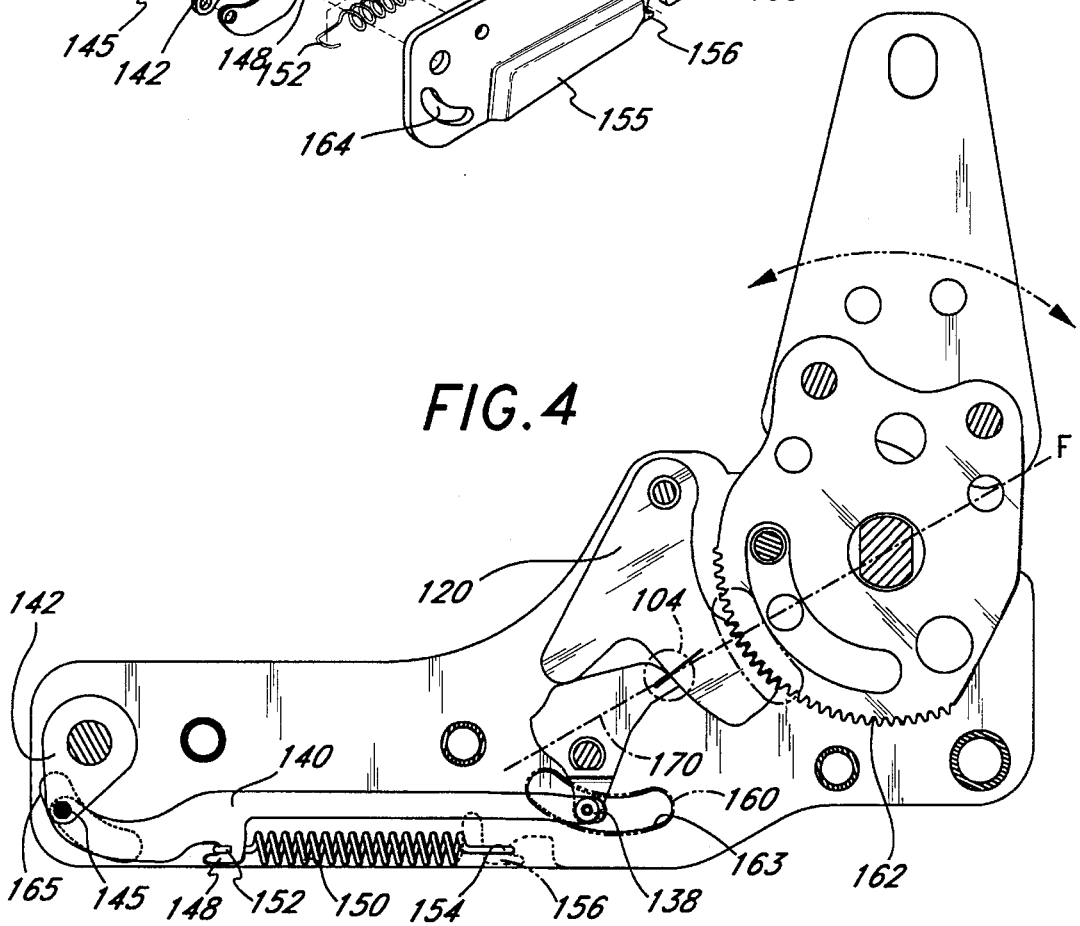
FIG. 4 is a sectional view of a hinge fitting in accordance with the present invention depicting the internal components and an operational force exerted upon the internal components.

FIGS. 4 and 5 show a side sectional view and a bottom view, respectively, of the preferred embodiment of a hinge fitting. Referring to FIG. 4 which depicts the hinge fitting as if plate 100 was removed, spring 150 is shown in its relaxed position while the reclining seat is in a locking position. As shown, spring hooks 152 and 154 are attached to the pre-formed connecting rod hook 148 and pre-formed plate hook 156, shown in phantom, of the plate 100. Referring to FIG. 5, it can be readily seen that no sharp edges nor moving parts of spring 150 are outwardly exposed during operation of the seatback support member. Specifically, most of the spring 150, including the end hook 154, is shielded by protective hood 158. Further, the distal portion of the hook end 156 of spring 150 is placed to extend inward towards the fixed plate structure 102 to prevent exposure which could cause damage to the seat structure or injury to a user.

As shown in FIG. 4, when plates 100 and 102 are fastened together, arcuate openings 160 and 163 are placed in alignment as are arcuate openings 164 and 165. The alignment of these pairs of openings form two arcuate slots which allow free movement of the connecting rod linkage assembly. Specifically, the arc transcribed by the pin 145 during operation of the hinge fitting coincides with the centerline of the arcuate slot formed by the openings 160 and 163. Similarly, the arc transcribed by the pin 138 coincides with the centerline of the arcuate slot formed by openings 164 and 165. When a torque is applied in a clockwise direction to operator 42 in order to urge connecting rod 140 so that spring 150 is expanded, there will be some lateral displacement at the respective ends of the connecting rod where pins 138 and 145 are attached. In previous hinge fittings, this displacement at the pin connection points caused contact with the interior side walls of plates 100 and 102 which in turn had the potential for eventually causing failure of the pin and the linkage assembly. Forming plates 100 and 102 with the openings 160, 163, 164 and 165 as shown enables the pins 138 and 145 to travel through their entire range of motion without contacting either of the plates 100 and 102.

An additional aspect of the present invention that pertains to the lock actuating mechanism will be discussed by reference to both FIGS. 4 and 6. FIG. 6 shows an enlarged view of the engagement area between a first cam arm 170 and the pawl 120 when the pawl 120 is in the locking position. Application of force to the seatback support member 108 can cause pawl 120 to transmit a force, represented in FIG. 6 by arrow F, to cam 124. Force F acts perpendicularly to the point of contact between cam 124 and pawl 120. To ensure that force F does not move pawl 120 toward the unlocking position, a camming surface 174 is shaped such that force F imparts a movement of rotation to cam 124 that tends to rotate cam 124 in the counter-clockwise direction (as viewed in FIG. 6). This in turn tends to urge pawl 120 toward the locking position as the camming surface 174 is in contact with a pawl locking surface 188 in response to the application force F. For this to occur, force F must lie on a line which passes above the center of pivot pin 128, as viewed in FIG. 4. A camming surface shape which facilitates this result is one that is parabolic. With this shape, the radius of curvature of surface 174 constantly increases as measured from point 176 to point 178 with respect to the center of pivot pin 128. Thus, as pawl 120 is moved into the locking position, the line of action of force F is more quickly brought into a position which lies above the center line of pivot pin 128 to produce the anti-unlocking effect described above.

To ensure that the cam 124 and the pawl 120 are in the correct positional arrangement to properly direct force F, alignment markings 180 and 182 are found on cam 124 and pawl 120, respectively. Specifically, alignment marking 180 is placed on an outwardly facing surface 184, which is perpendicular to camming surface 174, of the cam arm 170, and alignment marking 182 is placed on an outwardly facing surface 186, which is perpendicular to the locking surface 188, of the pawl 120. As shown in FIG. 6, alignment marking 180 extends substantially to and, desirably all the way to, an edge of cam arm 170 formed by the intersection of the surfaces 184 and 174. Likewise, alignment marking 182 extends substantially to an edge of pawl 120 formed by the intersection of the surfaces 186 and 188. Desirably, the alignment markings are positioned such that whenever the stacked tolerances are such that the hinge fitting will remain locked despite a given torque load, the alignment marking 180 on the surface 186 of the pawl 120 is to the left of the alignment marking 180 on the surface 184 of the cam arm 170. The precise alignment will vary due to variations in the size and shape of the cam and pawl, as well as for other reasons.

In contrast to prior hinge fittings, the alignment marks are positioned directly on the cam and pawl, rather than the pawl and housing, thereby giving a more reliable indication of whether the camming surface 174 of the cam 170 and the locking surface 180 of the pawl 120 are positioned relative one another such that they will maintain the locking engagement of the hinge fitting.

Importantly, since the alignment markings extend substantially to the edge, between surfaces 184 and 174 and between 186 and 188, respectively, of their respective components, no guess-work is required by the worker assembling the unit to determine whether the fitting is within acceptable tolerances. That is, if the alignment marking on the pawl is to the left (as shown in FIG. 6) of the alignment marking on the cam, force F will be properly directed above the center line of pivot pin 128 thereby ensuring that the force actually urges the cam more forcefully into engagement with the pawl.

The relative position of these alignment markings can be viewed once the internal components of the fitting are assembled, but before the sandwich plates are attached together. Desirably, a view window 161 is formed as part of plate 100 which will also allow easy verification of alignment after both plates are assembled.

A final feature of the present invention can be seen with reference to FIGS. 7 and 8. FIGS. 7 and 8 are side views of the present invention that depict the internal components of the fixed apparatus. In the commercial market, it is typically desired that adjustable hinge fittings have a certain maximum rearwardly inclined position. As a result, hinge fittings are typically manufactured to allow a single predetermined maximum inclined position. Currently, in the commercial market for hinge fittings there are a finite number of desired maximum reclining levels. Because of this, manufacturers usually design and construct several separate hinge fittings each tailored to a specific customer's needs. Manufacturing a separate hinge fitting for each specific need can be very costly and may take longer than a customer is willing to wait. Two maximum reclining levels for seats which are commonly desired are for those which recline to 30 degrees and 45 degrees from the vertical resting position.

A hinge fitting which can be universally manufactured but later configured for several applications is therefore highly desirable. In FIGS. 7 and 8 there is shown, in accordance with the present invention, a seatback support member which is uniquely manufactured to accommodate two separate maximum reclining levels. FIG. 7 shows a seatback support member having plates 100 and 102 that are formed with two circular apertures. One circular aperture is formed by alignment of openings 134 and 135, and the second circular aperture is formed by alignment of openings 136 and 137. A pin is placed in either of these apertures, depending upon which maximum reclining level is desired.

FIG. 7 shows a seatback support member configured with a pin 132 placed in aperture formed by opening 134 and 135. The pin 132 passes through arcuate aperture 130 of seatback support portion 110. The pin 132 is manufactured to have a diameter slightly less than the width of arcuate aperture 130 in order to fit through aperture 130 without interfering with the operation of the seatback support member 108. Placement of the pin 132 is such that the axis of the pin is positioned at a point along the centerline of the arc transcribed by aperture 130. Seatback support member 108 is thus allowed to rotate about pivot pin 116 to a point at which the pin 132 abuts lower portion 110 at the end of the arcuate aperture 130. As shown in FIG. 7, this allows seatback support member to recline to a level of about 45 degrees.

Both circular apertures formed by openings 134–137 are placed at points coincident to an arc transcribed with a center located at the pivot pin 116. In order to obtain a maximum reclining level of only 30 degrees, pin 132 may be positioned in the circular aperture formed by alignment of openings 136 and 137 as shown in FIG. 8. In this position, the pin 132 will abut lower portion 110 at the end of the arcuate aperture 130 sooner during clockwise rotation of seatback support member 108. Manufacturing only one type of hinge fitting which may be configured in multiple ways is economically superior to manufacturing multiple hinge fittings for various needs. The particular twin-configuration hinge fitting depicted in FIGS. 7 and 8 is, of course, only exemplary. This same design could be used for producing a hinge fitting with three or more possible configurations having a variety of maximum reclining positions.

From the preceding description of the preferred embodiments, it is evident that the objects of the invention are attained. Although the invention has been described and illustrated in detail, it is to be clearly understood that the same is by way of illustration and example only and is not to be taken by way of limitation. The spirit and scope of the invention are to be limited only by the terms of the appended claims.

I claim:

1. A hinge fitting for a reclining vehicle seat structure, comprising:

a fixed support assembly comprising a pair of sandwich bracket plates;

a seatback support assembly pivotally connected to said fixed support assembly by a first pivot assembly, said seatback support assembly being movable from an upright position, rearwardly through a range of rearwardly inclined positions;

a rotatable locking member positioned at least partially between said bracket plates, pivotally connected to said fixed support assembly by a second pivot assembly, said second pivot assembly fixing said seatback support assembly in adjusted positions throughout the range of rearwardly inclined positions, said locking member defining a first face and first engagement surface, said first face and said first engagement surface being generally perpendicular to one another and intersecting along a first edge, said first face of said locking member defining a first alignment marking extending substantially to said first edge;

a lock actuator assembly, said lock actuator assembly including a rotatable cam pivotally connected to said fixed support assembly by a third pivot assembly, said cam defining a second face and a second engagement surface, said second face and said second engagement surface being generally perpendicular to each another and intersecting along a second edge, said second face of said cam defining a second alignment marking extending substantially to said second edge, said second engagement surface engageable with said locking member to cam said locking member into said locking position and engaging said locking member at an engagement point when said locking member is in said locking position;

wherein said locking member and said cam are sized and shaped such that when said first alignment marking is positioned to a predetermined side of said second alignment marking said engagement point is located such that a force acting perpendicularly at said engagement point urges said cam into engagement with said locking member, thereby preventing movement of said locking member out of said locking position in response to forces applied to said seatback support member.

2. A hinge fitting for a reclining vehicle seat as described in claim 1 wherein one of said pair of sandwich bracket plates defines an aperture and wherein said alignment markings are positioned in said aperture formed in said sandwich bracket plate when said lock actuator assembly is in a locking position for viewing the relational position of said first and said second alignment markings.

3. A hinge fitting for a reclining vehicle seat as described in claim 1 wherein said cam is biased by a spring toward said locking position.

4. A hinge fitting for a reclining vehicle seat as described in claim 1 wherein said lock actuator assembly includes a fourth pivot assembly connected to one of said sandwich bracket plates and operatively linked to said cam for transferring a rotational force to rotate said cam.

5. A hinge fitting for a reclining vehicle seat as described in claim 4 wherein said fourth pivot assembly is linked to said cam through a link which is pivotally attached to said fourth pivot assembly by a first connecting pin and pivotally attached to said cam by a second connecting pin.

6. A hinge fitting for a reclining vehicle seat as described in claim 5 wherein one of said sandwich bracket plates is formed with an aperture positioned and shaped such that it exposes one of said connecting pins throughout said connecting pin's entire range of motion thereby preventing said connecting pin from contacting said sandwich bracket plate.

* * * * *